United States Patent
Scharf et al.

(10) Patent No.: US 7,690,849 B2
(45) Date of Patent: Apr. 6, 2010

(54) FIBER OPTIC CONNECTOR, ACTIVE CONTACT INSERTS THEREFOR, AND ASSOCIATED METHODS

(75) Inventors: Robert Marc Scharf, West Palm Beach, FL (US); Randal Bruce Lord, Rogersville, TN (US)

(73) Assignee: Protokraft, LLC, Kingsport, TN (US)

( * ) Notice: Subject to any disclaimer, the term of this patent is extended or adjusted under 35 U.S.C. 154(b) by 5 days.

(21) Appl. No.: 11/749,580

(22) Filed: May 16, 2007

(65) Prior Publication Data

US 2008/0285923 A1 Nov. 20, 2008

(51) Int. Cl.
G02B 6/36 (2006.01)
H04B 10/00 (2006.01)

(52) U.S. Cl. .............................. 385/88; 385/92; 398/138
(58) Field of Classification Search ........................ None
See application file for complete search history.

(56) References Cited

U.S. PATENT DOCUMENTS

| | | | |
|---|---|---|---|
| 3,370,264 A | 2/1968 | Kelly et al. ................. 339/217 |
| 4,140,367 A | 2/1979 | Makuch et al. .......... 350/96.22 |
| 4,720,630 A | 1/1988 | Takeuchi et al. ............ 250/227 |
| 4,798,441 A | 1/1989 | Clark ........................ 350/96.2 |
| 5,448,676 A | 9/1995 | White et al. .................. 385/88 |
| 5,596,665 A | 1/1997 | Kurashima et al. ............ 358/92 |
| 5,930,428 A | 7/1999 | Irwin et al. ................... 385/88 |
| 6,324,610 B1 | 11/2001 | Lord et al. ................... 710/126 |
| 6,431,764 B1 | 8/2002 | Scharf et al. ................. 385/88 |
| 6,722,789 B1 | 4/2004 | Hyzin et al. ................... 385/78 |
| 6,817,782 B2 | 11/2004 | Togami et al. ................ 385/92 |
| 6,873,800 B1 * | 3/2005 | Wei et al. ..................... 398/138 |
| 6,950,229 B2 * | 9/2005 | Young et al. ................. 359/333 |
| 6,996,304 B2 | 2/2006 | Aronson et al. ............... 385/14 |
| 7,093,985 B2 | 8/2006 | Lord et al. ..................... 385/89 |
| 2004/0042740 A1 | 3/2004 | Ohno et al. .................... 385/92 |
| 2005/0078917 A1 | 4/2005 | Yuuki .......................... 358/88 |
| 2005/0089280 A1 | 4/2005 | Kumar et al. ................. 385/88 |
| 2005/0175299 A1 | 8/2005 | Hargis et al. .................. 385/93 |
| 2005/0244111 A1 | 11/2005 | Wolf et al. ..................... 385/93 |
| 2005/0286838 A1 | 12/2005 | Oki et al. ....................... 385/92 |
| 2005/0286839 A1 | 12/2005 | Yoshikawa .................... 385/92 |
| 2006/0008213 A1 | 1/2006 | Lord et al. ..................... 385/89 |
| 2006/0029337 A1 | 2/2006 | Vancoille et al. .............. 385/94 |
| 2006/0062526 A1 | 3/2006 | Ikeuchi ......................... 385/88 |
| 2006/0067631 A1 | 3/2006 | Wang et al. ................... 385/92 |
| 2006/0199407 A1 | 9/2006 | Demaret et al. ............... 439/95 |

OTHER PUBLICATIONS

"ELIO® High Speed Fiber Optic Technology", 10 pages, available at www.souriau.com, 2003.
SB600 Series, pp. 157-168, available at www.souriau.com/fileadmin/Souriau/product_pdf/P157-168.pdf, 2003.

* cited by examiner

Primary Examiner—Tina M Wong
(74) Attorney, Agent, or Firm—Allen, Dyer, Doppelt, Milbrath & Gilchrist, P.A.

(57) ABSTRACT

A fiber optic connector insert for a connector may include a housing to be received within a passageway of a connector body, a circuit board extending longitudinally within the housing and having opposing first and second ends, and a first base and first electrically conductive pins carried thereby. The first electrically conductive pins may be coupled to the circuit board adjacent the first end thereof. The fiber optic connector insert may also include an opto-electronic (O/E) converter having a second base and second electrically conductive pins extending outwardly therefrom. The second electrically conductive pins may be coupled to the circuit board adjacent the second end thereof.

37 Claims, 4 Drawing Sheets

FIBER OPTIC CONNECTOR, ACTIVE CONTACT INSERTS THEREFOR, AND ASSOCIATED METHODS

FIELD OF THE INVENTION

The present invention relates to the field of connectors, and, more particularly, to optical connectors and related methods.

BACKGROUND OF THE INVENTION

Fiber optic cabling is used in various types of air, space, land, and sea-based platforms to provide high-speed data communications for on-board electronic systems, such as radar and mission control computer systems. In a typical fiber optic connector, one portion of the connector is coupled to the housing of the electronic system and extends rearwardly therefrom. A passive mating insert, for example, a Series 801 (1.25 mm/2.5 mm diameter) fiber optic ferrule from the Aeronautical Radio, Incorporated of Annapolis, Md. or an Military Standard 29504 (1.6 mm diameter) fiber optic ferrule (passive mating insert), may be removably positioned into each passageway of the body of the fiber optic connector. The connector body may comprise, for example, a standard Series 600 connector from Aeronautical Radio, Incorporated of Annapolis, Md. (ARINC Series 600 connector).

Such typical fiber optic connectors are passive connectors, and consequently, these connectors merely pass the optical signals through the connector. Passive connectors usually have fiber optic cabling extending therefrom to opto-electronic (O/E) converters within the housing of the electronic system. The O/E converters convert electrical signals to optical signals, and/or optical signals to electrical signals.

When routing each optical fiber from the connector to an appropriate O/E converter within the housing, several difficulties may occur. First, a minimum cable bend radius should be observed within the housing. Second, each time an optical signal passes through a connector interface, the power level of the optical energy is reduced, which subtracts from the overall optical link budget of the electronic system.

In an expanded function electronic system, the optical fiber from the connector may be routed through an optical fiber backplane within the housing, which routes the optical fibers to specific locations on an electrical backplane that is also within the housing. Circuit boards mounting the O/E converters connect through the electrical backplane to the optical fiber backplane. The use of an optical fiber backplane within the housing may add to the cost, weight and complexity of the electronic system, as well as to the overall volume of the system. This added weight may be particularly problematic for connectors which are used in aircraft applications.

A significant advance in the field of active fiber optic connectors is disclosed in U.S. Pat. No. 7,093,985 to Lord et al., assigned to the assignee of this application. The connector is a wall mount connector that comprises a plurality of O/E converters. U.S. Pat. No. 5,596,665 to Kurashima et al. discloses a fiber optic connector having a rectangular housing and includes portions to receive mating plug connector portions, and circuitry within the housing converts optical signals to electrical signals and vice-versa. The fiber optic connector includes reference surfaces and bias members to permit insertion of the fiber optic sleeves.

Another active fiber optic connector is disclosed in U.S. Patent Application No. 2003/0118293 to Canace et al. The fiber optic connector may be mounted to a bulkhead or wall, and includes fingers to provide resilience for leeway in the positioning of the fiber optic connector relative to the wall in the direction of the optical axis of the optical fibers. Flexible circuit boards are also used to mount the components within the housing. This fiber optic connector also has a rectangular housing.

Another fiber optic connector is disclosed in U.S. Pat. No. 5,930,428 to Irwin et al. The fiber optic connector is a line replaceable unit (LRU) that is installed into the chassis of the electronic system. The LRU comprises an O/E converter receiving and transmitting optical signals.

U.S. Pat. No. 5,448,676 to White et al. discloses a fiber optic connector insert. The fiber optic connector insert includes an O/E converter, receives an optical fiber ferrule on one end, and has an electrical contact on the opposing end. To properly secure the optical fiber ferrule in the fiber optic connector insert, the fiber optic connector insert comprises retainer clips to engage a retaining shoulder on the optical connector. This retaining clip and shoulder keep the optical fiber ferrule of the passive optical connector adjacent the O/E converter.

Another fiber optic connector insert is disclosed in U.S. Patent Application No. 2006/0199407 to Demaret et al. The fiber optic connector insert includes an O/E converter and is capable of being positioned in the passageway of a connector body.

Notwithstanding the known active fiber optic connector inserts and connectors, an active fiber optic connector insert that is both readily manufactured and assembled, yet mechanically robust may be desired.

SUMMARY OF THE INVENTION

In view of the foregoing background, it is therefore an object of the present invention to provide an active fiber optic connector insert that may be mechanically robust and thereby reliable yet still readily manufactured and assembled.

This and other objects, features, and advantages in accordance with the present invention are provided by a fiber optic connector insert for a connector comprising a connector body having a plurality of passageways therein for mounting respective active fiber optic connector inserts. Moreover, the fiber optic connector insert may comprise a housing to be received within a passageway of the connector body, a circuit board extending longitudinally within the housing and having opposing first and second ends, and a first base and at least one first electrically conductive pin carried thereby. The first electrically conductive pin may be coupled to the circuit board adjacent the first end thereof.

The fiber optic connector insert may further include an opto-electronic (O/E) converter comprising a second base and at least one second electrically conductive pin extending outwardly therefrom. The second electrically conductive pin may be further coupled to the circuit board adjacent the second end thereof. In other words, the circuit board may be straddle mounted on the first and second electrically conductive pins carried by the first and second bases, respectively. Advantageously, the fiber optic connector insert may be readily manufactured and assembled, and the fiber optic connector insert may be mechanically robust, thereby resistant to harsh environments. The fiber optic connector insert may further comprise a retention shoulder on the housing for mounting the fiber optic connector insert within the passageway of the connector body, for example.

Additionally, the first electrically conductive pin may comprise a plurality thereof on opposing sides of the circuit board. The second electrically conductive pin may similarly comprise a plurality thereof on opposing sides of the circuit board.

The circuit board may comprise a power level, a signal level, and a shield therebetween, for example. Advantageously, the signal level is shielded from interference from the power level.

The first electrically conductive pins may extend through the first base to define external connection pins, for example. The housing may have a cylindrical shape defining a longitudinal axis, and the circuit board may be mounted to extend along the longitudinal axis.

The fiber optic connector insert may further comprise an optical fiber termination assembly coupled to the O/E converter. The optical fiber termination assembly may comprise an optical fiber ferrule stub, and an alignment sleeve mounting the optical fiber ferrule stub adjacent the O/E converter. The alignment sleeve may comprise a tubular body having a reduced inner diameter portion defining a stop for positioning the optical fiber ferrule stub, for example, relative to the O/E converter.

In some embodiments, the O/E converter may further comprise an optical source, and the fiber optic connector insert may further comprise circuitry carried by the circuit board and coupled to the optical source. Conversely, the O/E converter may further comprise an optical detector, and the fiber optic connector insert may further comprise circuitry carried by the circuit board and coupled to the optical detector. The O/E converter may further comprise an O/E conversion device, such as an optical source and/or an optical detector, carried by the second base.

At least the housing and the second base may comprise electrically conductive material, for example. Advantageously, the electrically conductive material may provide electromagnetic shielding. The fiber optic connector insert may further comprise a dielectric potting material surrounding the circuit board and filling the housing. The dielectric potting material may provide both mechanical protection to the circuitry carried by the circuit board.

A method aspect is directed to making the fiber optic connector insert for the connector comprising the connector body having the plurality of passageways therein for mounting respective fiber optic connector inserts. The method may comprise providing the housing to be received within the passageway of the connector body, the first base and the first electrically conductive pins carried thereby, and the O/E converter comprising the second base and the second electrically conductive pins extending outwardly therefrom. The method may further comprise mounting the circuit board to extend longitudinally within the housing and to have opposing first and second ends, coupling the first electrically conductive pins to the circuit board adjacent the first end thereof, and coupling the second electrically conductive pins to the circuit board adjacent the second end thereof.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
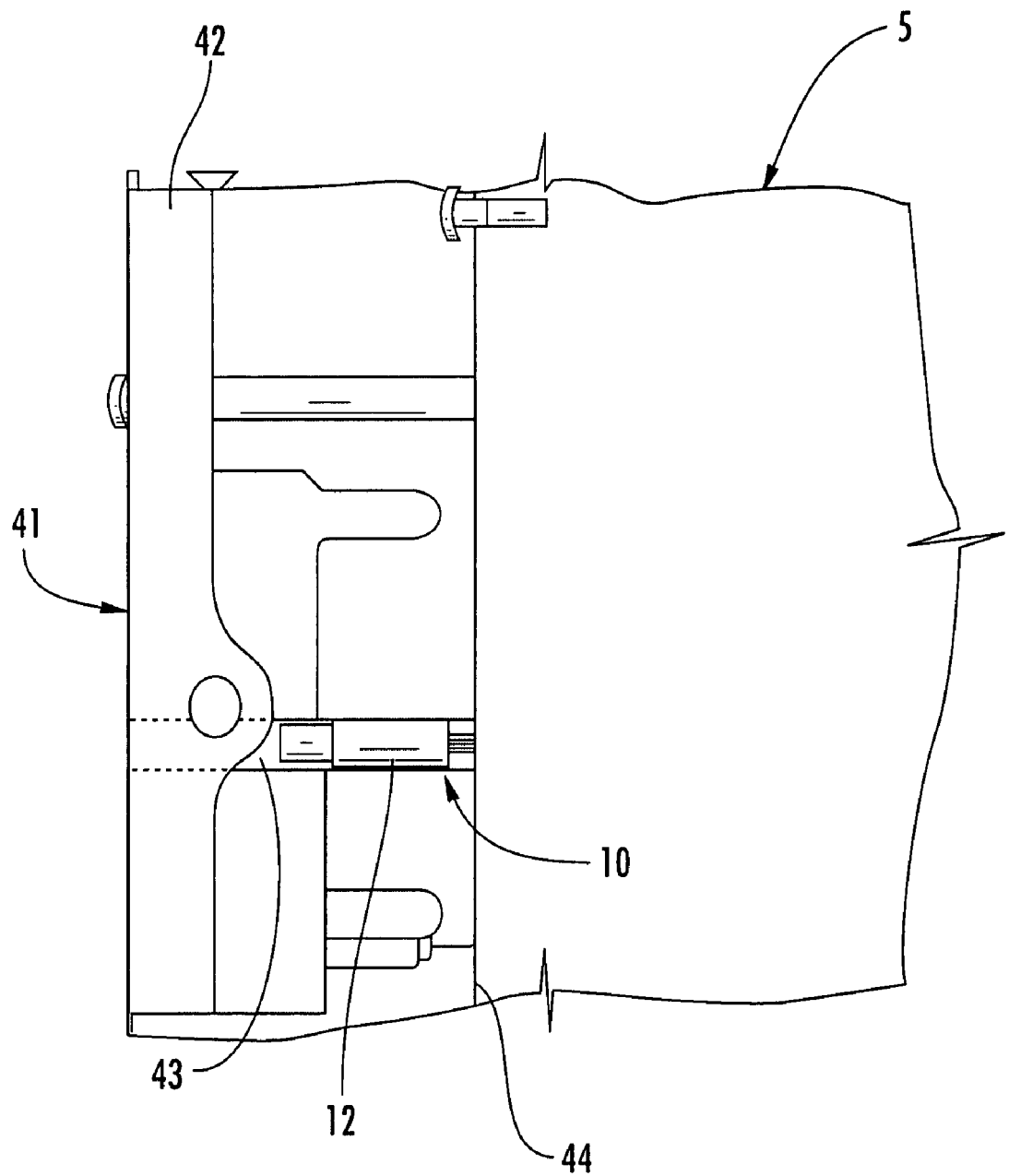
FIG. 1 is a fragmentary side view of an electronic device illustrating a fiber optic connector and insert according to the present invention.

Referring initially to FIG. 1, a fiber optic connector 41 installed in an electronic device 5 is now described. The connector 41 includes a connector body 42 having a plurality of passageways 43 therein for mounting respective fiber optic connector inserts 10, only one of which is shown for clarity of explanation. The connector 41 illustratively comprises an ARINC Series 600 connector, for example, but as will be appreciated by those skilled in the art, the connector may comprise other connectors having passageways for receiving fiber optic connector inserts 10. A passive mating insert carrying an optical signal, not shown, may be mated to the fiber optic connector insert 10. The passive mating insert may comprise, for example, a passive mating insert. As will be appreciated by those skilled in the art, the passive mating insert may comprise any optical passive mating insert.

The fiber optic connector insert 10 illustratively includes a housing 12 that is received by the passageway 43, for example an ARINC 600 Series connector size 8 (Quadrax) passageway, of the connector 41. As will be appreciated by those skilled in the art, the housing 12 may have other shapes and sizes. Thereby, the fiber optic connector insert 10 may fit into passageways of varying size and shape and be compatible with other connectors.

Figure 2:
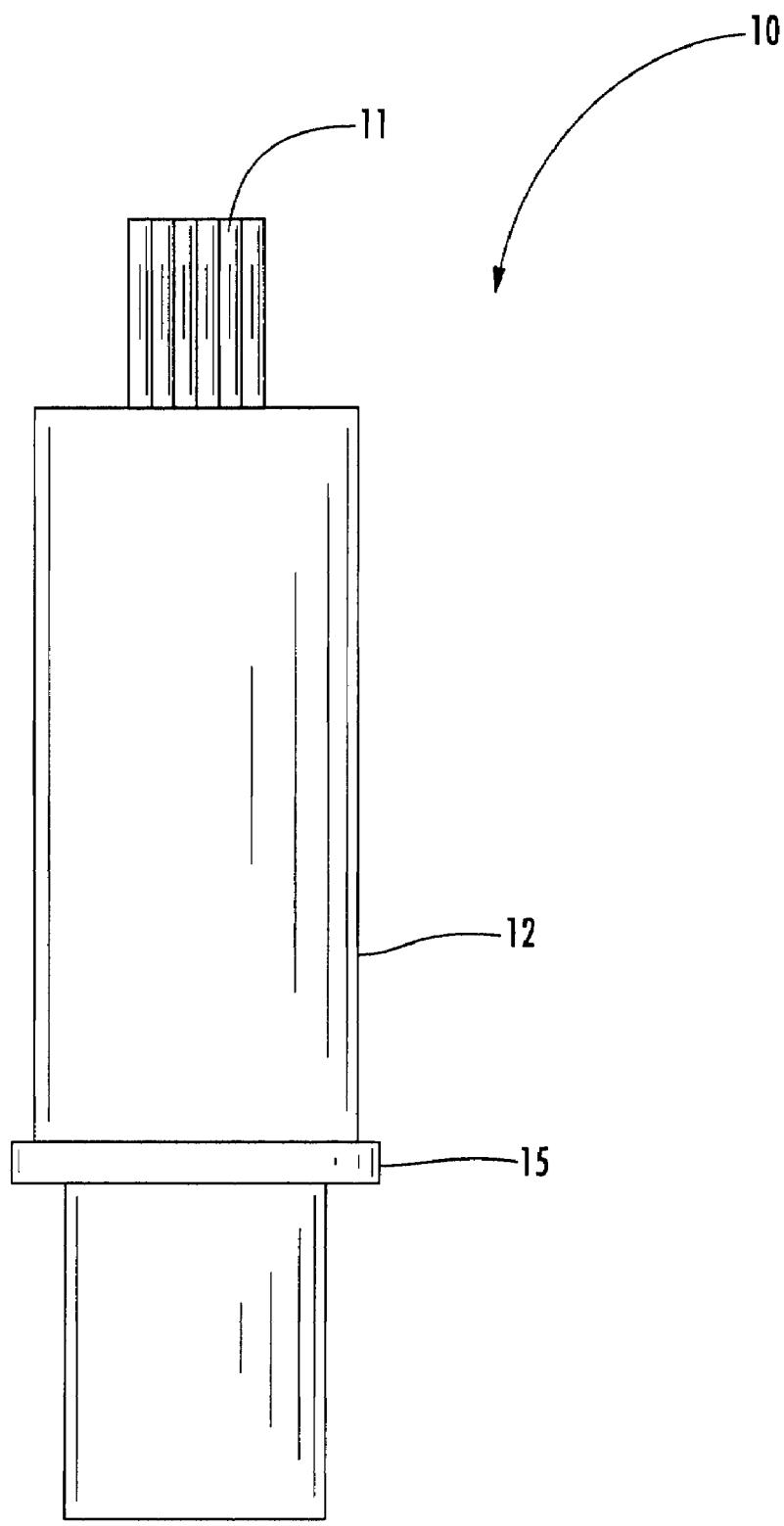
FIG. 2 is a side elevational view of the fiber optic insert as in FIG. 1.

Referring now additionally to FIG. 2, the fiber optic connector insert 10 illustratively includes a retention shoulder 15 on the housing for mounting the fiber optic connector insert within the passageway 43 of the connector body 42. Advantageously, the fiber optic connector insert 10 may be accurately positioned in the passageway 43 and establish a reliable electrical coupling to a backplane 44 and a reliable optical coupling to the passive mating insert. Moreover, the retention shoulder 15 may permit the passive mating insert to be removed without unintentionally removing the fiber optic connector insert 10, and may permit a plurality of the fiber optic connector inserts 10 to be consistently and reliably received by the plurality of passageways 43 of the connector body 42. The retention shoulder 15 may also permit the passive mating insert to be installed in the passageway 42 without applying undesirable force on the backplane 44.

Figure 3:
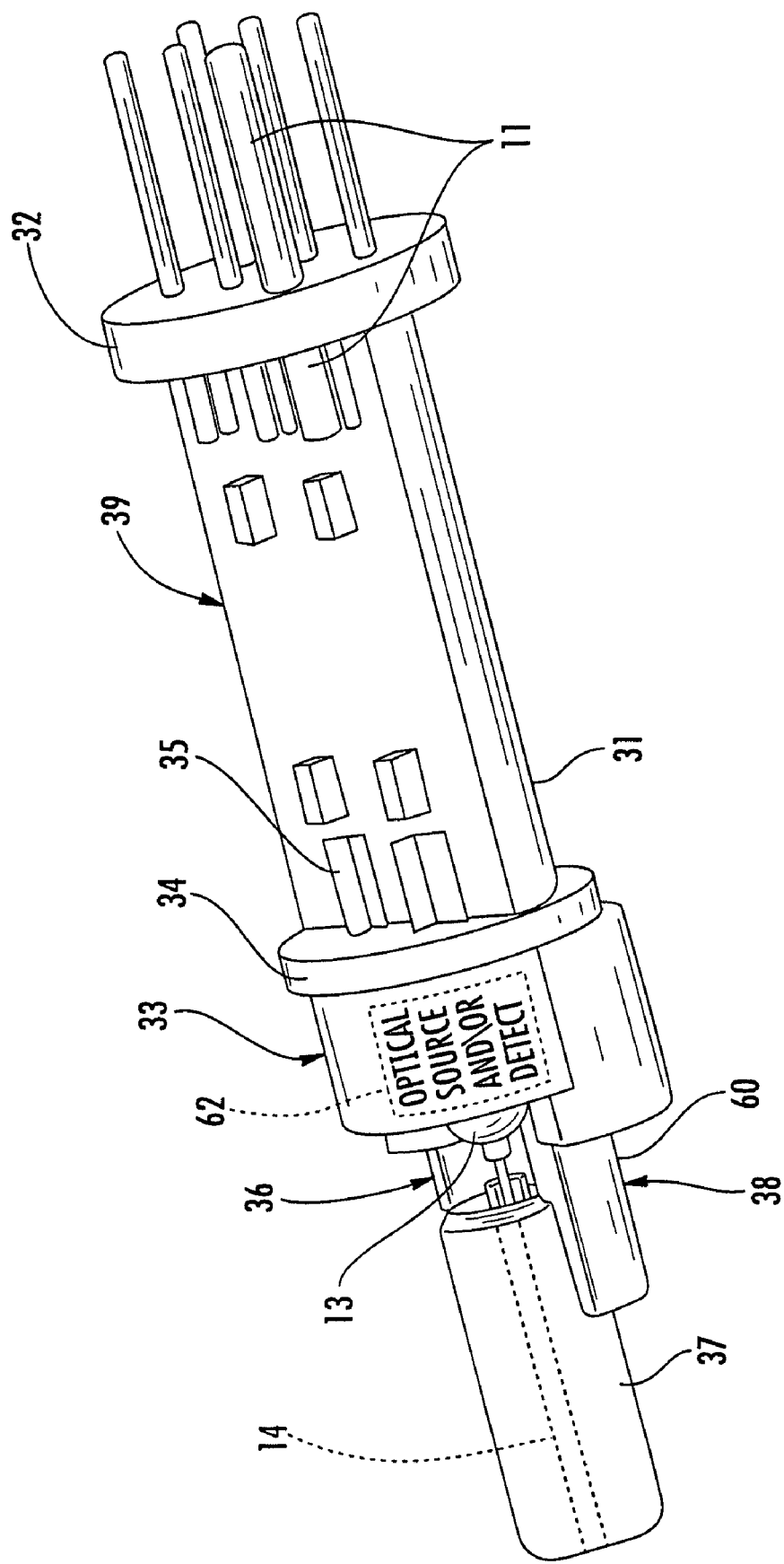
FIG. 3 is a fragmentary perspective view of the fiber optic insert as in FIG. 1.

Referring now additionally to FIG. 3, the fiber optic connector insert 10 also illustratively includes a circuit board 31 extending longitudinally within the housing 12 and has opposing first and second ends. The fiber optic connector insert 10 further includes a first base 32 and a first plurality of electrically conductive pins carried thereby 11. Although the fiber optic connector insert 10 illustratively includes six first electrically conductive pins 11, three pins on top of the circuit board 31 and three on the bottom of the circuit board, the fiber optic connector insert may include as few as one and more than the six shown.

The first plurality of electrically conductive pins 11 are coupled internally to the circuit board 31 adjacent the first end thereof. The fiber optic connector insert 10 further includes an opto-electronic (O/E) converter 33 comprising a second base 34 and a second plurality of electrically conductive pins 35 extending outwardly therefrom. The second plurality of electrically conductive pins 35 are further coupled to the circuit board 31 adjacent the second end thereof. Although the fiber optic connector insert 10 illustratively includes six second electrically conductive pins 35, three pins on top of the circuit board 31 and three on the bottom of the circuit board, the fiber optic connector insert may include as few as one and more than the six shown.

The first plurality of electrically conductive pins 11 extend through the first base 32 to define a plurality of external connection pins. Advantageously, this allows the fiber optic connector insert 10 to be easily connected to electrical circuitry, such as other ICs, within the connector 41, and circuitry via the backplane 44 (FIG. 1). Illustratively, the housing 12 has a cylindrical shape defining a longitudinal axis, and the circuit board 31 is illustratively mounted to extend along the longitudinal axis.

Additionally, the first plurality of electrically conductive pins 11 are divided into two groups and positioned on opposing sides of the circuit board 31. The second plurality of electrically conductive pins 35 are also divided into two groups and positioned on opposing sides of the circuit board 31. Thereby, the circuit board 31 is straddle mounted between the first base 32 and the second base 34 of the O/E converter 33. As will be appreciated by those skilled in the art, the first base 32 is both mechanically and electrically coupled to the circuit board 31 by the first plurality of electrically conductive pins 11, and the circuit board 31 is both mechanically and electrically coupled to the O/E converter 33 by the second plurality of electrically conductive pins 35.

The fiber optic connector insert 10 includes an optical fiber termination assembly 36 coupled to the O/E converter 33. The optical fiber termination assembly 36 comprises an optical fiber 14. As will be appreciated by those skilled in the art, the optical fiber may comprise an optical fiber, such as, 62.5/125 μm or 50/125 μm multimode optical fiber, but single mode fibers may be used as well. The optical fiber termination assembly 36 illustratively comprises an optical fiber ferrule stub 37, and an alignment sleeve 38 mounting the optical fiber ferrule stub adjacent the O/E converter 33.

As will be appreciated by those skilled in the art, the optical fiber termination assembly 36 may alternatively comprise a receptacle, not shown, for receiving an optical fiber from the passive mating insert. The alignment sleeve 38 includes a tubular body having a reduced inner diameter portion 60 defining a stop for positioning the optical fiber ferrule stub 37. Advantageously, the optical ferrule stub 37 may be accurately positioned, for example, adjacent the O/E converter 33 in closely spaced relation therefrom.

The O/E converter 33 further comprises an O/E conversion device carried by the second base 34. The O/E conversion device further comprises an optical source and/or an optical detector 61 and the fiber optic connector insert 10 further comprises circuitry 39 carried by the circuit board 31 and coupled to the optical source and/or the optical detector. As will be appreciated by those skilled in the art, the optical source may comprise a laser, a light emitting diode, or any other suitable optical source. As will be appreciated by those skilled in the art, the optical detector may comprise a photodiode, a charge-coupled device, for example, or any other suitable photosensitive device. Moreover, as also appreciated by those skilled in the art, the O/E converter 33 may comprise a shape compatible with TO-can optical packaging.

The O/E converter 33 illustratively includes a lens 13 for accurately directing the optical signal between the optical fiber 14 carried by the optical fiber ferrule stub 37 and the optical detector and/or optical source. As will be appreciated by those skilled in the art, the lens 13 may comprise any form of lens, for example a ball lens. Moreover, as will be appreciated by those skilled in the art, any device capable of directing the optical signal from the optical fiber 14 carried by the optical ferule stub 37 may be used.

Figure 4:
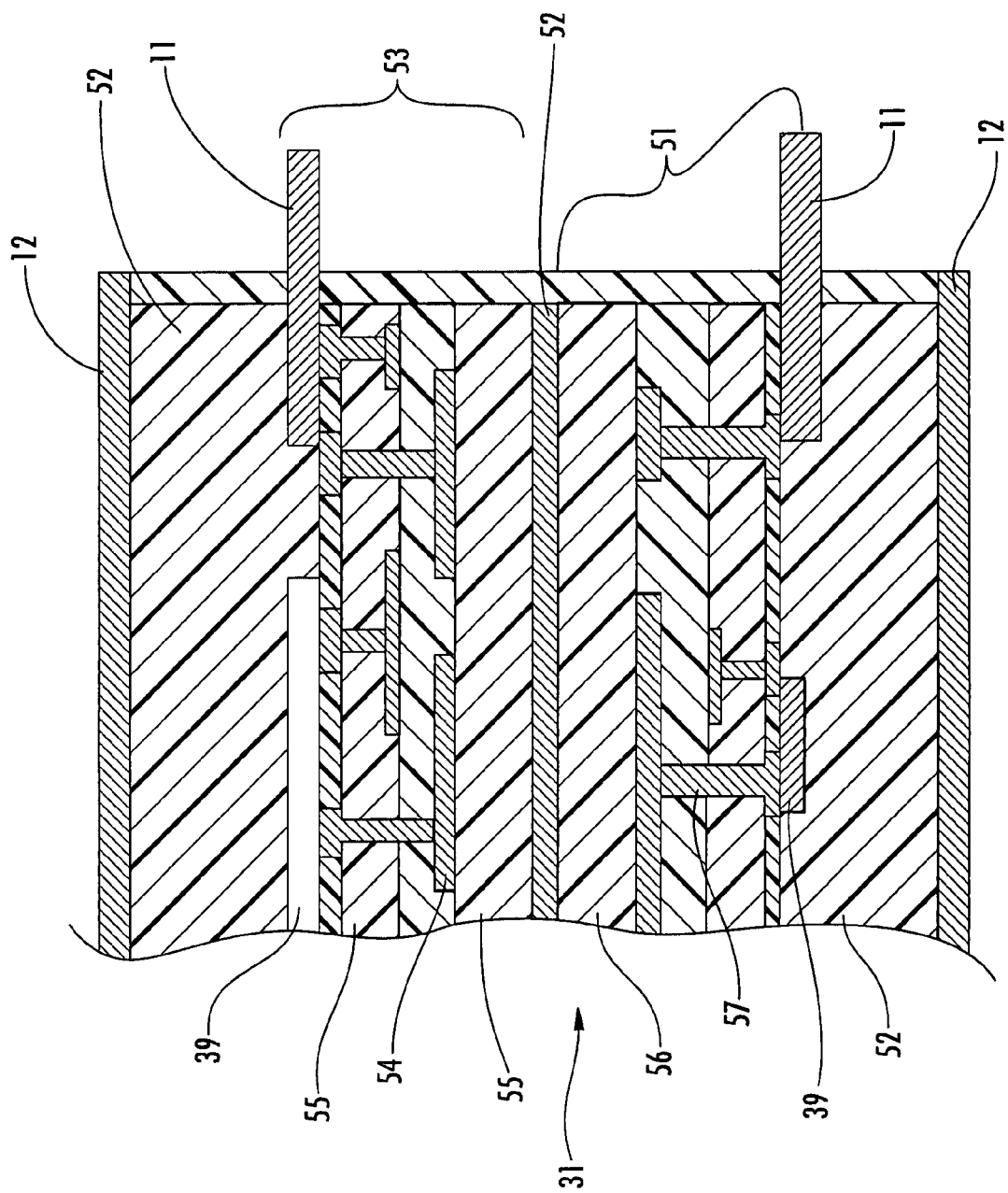
FIG. 4 is an enlarged longitudinal cross-section view of a portion of the fiber optic connector insert as in FIG. 1.

Referring now additionally to FIG. 4, the circuit board 31 illustratively includes a power level 51, a signal level 53, and a shield 52 therebetween. Advantageously, the signal level 53 is shielded from interference from the power level 51. As will be appreciated by those skilled in the art, the shield 52 may comprise an electrically conductive material providing electromagnetic shielding between a high frequency operation of the signal level 53 and a low frequency operation of the power level 51. Moreover, although the shield 52 is illustrated as comprising a single layer, as will be appreciated by those skilled in the art, the shield may comprise a plurality of electrically conductive layers.

The signal level 53 illustratively includes conductive traces 54 for electrically coupling the first plurality of pins 11 to the circuitry 39 carried by the circuit board 31, and a plurality of intervening dielectric layers 55. As will be appreciated by those skilled in the art, at least some of the conductive traces 54 may be arranged in differential pairs, and thereby provide the shortest possible signal path and minimize skew in the conductive traces.

The power level 51 illustratively includes conductive traces 57 for electrically coupling the first plurality of pins 11 to the circuitry 39 carried by the circuit board 31, and a plurality of intervening dielectric layers 56. Although the fiber optic connector insert 10 is illustrated with three dielectric layers and three conductive traces for the signal 53 and power levels 51, respectively, the fiber optic connector insert may include as few as one and more than three conductive traces and dielectric layers for the signal and power levels.

The housing 12 and the second base 34 may comprise electrically conductive material. As will be appreciated by those skilled in the art, the connector body 42 may also comprise electrically conductive material. Advantageously, when the fiber optic connector insert 10 is received by the passageway 43 of the connector body 42, the housing 12 may provide electromagnetic shielding by coupling the shield 52 with grounded connector body.

The fiber optic connector insert 10 illustratively includes a dielectric potting material 52 surrounding the circuit board 31 and filling the housing 12. As will be appreciated by those skilled in the art, the dielectric potting material may comprise epoxy or any other material that is an electrical insulator and is mechanically robust. The first base 32 also illustratively comprises dielectric material. The dielectric potting material 52 and the first base 32 may provide mechanical and electrical protection to the circuitry 39 carried by the circuit board 31.

A method aspect is directed to making the fiber optic connector insert 10 for the connector 41 comprising the connector body 42 having a plurality of passageways 43 therein for mounting respective fiber optic connector inserts. The method may comprise providing the housing 12 to be received within the passageway 43 of the connector body 42, the first base 32 and the first electrically conductive pins 11 carried thereby, and the O/E converter 33 comprising the second base 34 and the second electrically conductive pins 35 extending outwardly therefrom. The method may further comprise mounting the circuit board 31 to extend longitudinally within the housing 12 and to have opposing first and second ends, coupling the first electrically conductive pins 11 to the circuit board 31 adjacent the first end thereof, and coupling the second electrically conductive pins 35 to the circuit board 31 adjacent the second end thereof.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A fiber optic connector insert for a connector comprising a connector body having a plurality of passageways therein for mounting respective fiber optic connector inserts, the fiber optic connector insert comprising:
   a housing to be received within a passageway of the connector body;
   a circuit board extending longitudinally within said housing and having opposing first and second ends, and opposing first and second largest surfaces;
   a first base extending transversely to said first end of said circuit board and at least one first electrically conductive pin carried by said first base, said at least one first electrically conductive pin being coupled to said circuit board adjacent the first end thereof; and
   an opto-electronic (O/E) converter comprising a second base extending transversely to said second end of said circuit board and at least one second electrically conductive pin extending outwardly from said second base, said at least one second electrically conductive pin being further coupled to said circuit board adjacent the second end thereof.

2. The fiber optic connector insert according to claim 1 wherein said circuit board comprises a power level, a signal level, and a shield therebetween.

3. The fiber optic connector insert according to claim 1 further comprising a retention shoulder on said housing for mounting the fiber optic connector insert within the passageway of the connector body.

4. The fiber optic connector insert according to claim 1 wherein said at least one first electrically conductive pin extends through said first base to define at least one external connection pin.

5. The fiber optic connector insert according to claim 1 wherein said housing has a cylindrical shape defining a longitudinal axis; and wherein said circuit board is mounted to extend along the longitudinal axis.

6. The fiber optic connector insert according to claim 1 wherein said at least one first electrically conductive pin comprises a plurality thereof on opposing sides of said circuit board; and wherein said at least one second electrically conductive pin comprises a plurality thereof on opposing sides of said circuit board.

7. The fiber optic connector insert according to claim 1 further comprising an optical fiber termination assembly coupled to said O/E converter.

8. The fiber optic connector insert according to claim 7 wherein said optical fiber termination assembly comprises an optical fiber ferrule stub, and an alignment sleeve mounting the optical fiber ferrule stub adjacent said O/E converter.

9. The fiber optic connector insert according to claim 8 wherein said alignment sleeve comprises a tubular body having a reduced inner diameter portion defining a stop for positioning said optical fiber ferrule stub.

10. The fiber optic connector insert according to claim 1 wherein said O/E converter further comprises an O/E conversion device carried by said second base.

11. The fiber optic connector insert according to claim 10 wherein said O/E conversion device further comprises an optical source; and further comprising circuitry carried by said circuit board coupled to said optical source.

12. The fiber optic connector insert according to claim 10 wherein said O/E conversion device further comprises an optical detector; and further comprising circuitry carried by said circuit board and coupled to said optical detector.

13. The fiber optic connector insert according to claim 1 wherein at least said housing and said second base comprise electrically conductive material.

14. The fiber optic connector insert according to claim 1 further comprising a dielectric potting material surrounding said circuit board and filling said housing.

15. A fiber optic connector insert comprising:
   a housing having a cylindrical shape defining a longitudinal axis;
   a circuit board extending along the longitudinal axis within said housing and having opposing first and second ends, and opposing first and second largest surfaces;
   a first base extending transversely to said first end of said circuit board and at least one first plurality of electrically conductive pins carried by said first base, said at least one first plurality of electrically conductive pins being coupled to said circuit board adjacent the first end thereof, said at least one first plurality of electrically conductive pins extend through said first base to define at least one first plurality of external connection pins; and
   an optoelectronic (O/E) converter comprising a second base extending transversely to said second end of said circuit board and at least one second plurality of electrically conductive pins extending outwardly from said second base, said at least one second plurality of electrically conductive pins being coupled to said circuit board adjacent the second end thereof.

16. The fiber optic connector insert according to claim 15 wherein said circuit board comprises a power level, a signal level, and a shield therebetween.

17. The fiber optic connector insert according to claim 16 further comprising an optical fiber termination assembly coupled to said O/E converter and including an optical fiber ferrule stub, and an alignment sleeve mounting the optical fiber ferrule stub adjacent said O/E converter; and wherein said alignment sleeve comprises a tubular body having a reduced inner diameter portion defining a stop for positioning said optical fiber ferrule stub.

18. A fiber optic connector comprising:
   a connector body having a plurality of passageways therein;
   a plurality of fiber optic connector inserts, each in a respective passageway of said connector body and comprising
      a housing to be received within a passageway of the connector body,
      a circuit board extending longitudinally within said housing and having opposing first and second ends, and opposing first and second largest surfaces,
      a first base extending transversely to said first end of said circuit board and at least one first electrically conductive pin carried by said first base, said at least one first electrically conductive pin being coupled to said circuit board adjacent the first end thereof, and an optoelectronic (O/E) converter comprising a second base extending transversely to said second end of said circuit board and at least one second electrically conductive pin extending outwardly from said second base, said at least one second electrically conductive pin being coupled to said circuit board adjacent the second end thereof.

19. The fiber optic connector according to claim 18 wherein said circuit board comprises a power level, a signal level, and a shield therebetween.

20. The fiber optic connector according to claim 18 wherein said plurality of fiber optic connector inserts further each comprises a retention shoulder on said housing for mounting said fiber optic connector insert within a respective passageway of the connector body.

21. The fiber optic connector according to claim 18 wherein said at least one first electrically conductive pin extends through said first base to define at least one external connection pin.

22. The fiber optic connector according to claim 18 wherein said housing has a cylindrical shape defining a longitudinal axis; and wherein said circuit board is mounted to extend along the longitudinal axis.

23. The fiber optic connector according to claim 18 wherein said at least one first electrically conductive pin comprises a plurality thereof on opposing sides of said circuit board; and wherein said at least one second electrically conductive pin comprises a plurality thereof on opposing sides of said circuit board.

24. The fiber optic connector according to claim 18 further comprising an optical fiber termination assembly coupled to said O/E converter and including an optical fiber ferrule stub, and an alignment sleeve mounting the optical fiber ferrule stub adjacent said O/E converter; and wherein said alignment sleeve comprises a tubular body having a reduced inner diameter portion defining a stop for positioning said optical fiber ferrule stub.

25. The fiber optic connector according to claim 18 wherein at least said housing and said second base comprise electrically conductive material.

26. The fiber optic connector according to claim 18 further comprising a dielectric potting material surrounding said circuit board and filling said housing.

27. A method for making a fiber optic connector insert comprising:
providing a first base extending transversely to a first end of a circuit board having opposing first and second largest surfaces and at least one first electrically conductive pin carried by the first base;
providing an opto-electronic (O/E) converter comprising a second base extending transversely to a second end of the circuit board and at least one second electrically conductive pin extending outwardly from the second base;
coupling the first end of the circuit board to the at least one first electrically conductive pin and coupling the second end of the circuit board to the at least one second electrically conductive pin; and
positioning a housing to surround the circuit board.

28. The method according to claim 27 wherein the circuit board comprises a power level, a signal level, and a shield therebetween.

29. The method according to claim 27 further comprising providing a retention shoulder on the housing for mounting the fiber optic connector insert within a passageway of a connector body.

30. The method according to claim 27 wherein the at least one first electrically conductive pin extends through the first base to define at least one external connection pin.

31. The method according to claim 27 wherein the housing has a cylindrical shape defining a longitudinal axis; and wherein circuit board extends along the longitudinal axis.

32. The method according to claim 27 wherein the at least one first electrically conductive pin comprises a plurality thereof on opposing sides of the circuit board; and wherein the at least one second electrically conductive pin comprises a plurality thereof on opposing sides of the circuit board.

33. The method according to claim 27 further comprising coupling an optical fiber termination assembly to the O/E converter.

34. The method according to claim 33 wherein the optical fiber termination assembly comprises an optical fiber ferrule stub, and an alignment sleeve mounting the optical fiber ferrule stub adjacent the O/E converter.

35. The method according to claim 34 wherein the alignment sleeve comprises a tubular body having a reduced inner diameter portion defining a stop for positioning the optical fiber ferrule stub.

36. The method according to claim 27 wherein the O/E converter further comprises at least one of an optical source and an optical detector.

37. The method according to claim 27 further comprising positioning a dielectric potting material to surround the circuit board and fill the housing.

* * * * *

UNITED STATES PATENT AND TRADEMARK OFFICE
CERTIFICATE OF CORRECTION

| | |
|---|---|
| PATENT NO. | : 7,690,849 B2 |
| APPLICATION NO. | : 11/749580 |
| DATED | : April 6, 2010 |
| INVENTOR(S) | : Scharf et al. |

It is certified that error appears in the above-identified patent and that said Letters Patent is hereby corrected as shown below:

Column 6, Line 48    Delete: "with grounded"
                     Insert: --with the grounded--

Column 10, Line 24   Delete: "wherein circuit"
Claim 31             Insert: --wherein the circuit--

Page 1 of 1

Signed and Sealed this

Seventeenth Day of August, 2010

David J. Kappos
*Director of the United States Patent and Trademark Office*